(12) United States Patent
Cogan

(10) Patent No.: US 9,372,649 B2
(45) Date of Patent: *Jun. 21, 2016

(54) SYSTEM AND METHOD FOR PRINTABLE DOCUMENT JOB SUBMISSION

(71) Applicant: PTI Marketing Technologies Inc., Solana Beach, CA (US)

(72) Inventor: Douglas Neal Cogan, Brookfield, IL (US)

(73) Assignee: PTI Marketing Technologies Inc., Solana Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/863,273

(22) Filed: Sep. 23, 2015

(65) Prior Publication Data

US 2016/0085491 A1 Mar. 24, 2016

Related U.S. Application Data

(63) Continuation of application No. 13/554,344, filed on Jul. 20, 2012, now Pat. No. 9,152,355.

(51) Int. Cl.
*G06K 15/00* (2006.01)
*G06F 3/12* (2006.01)
*G06F 15/00* (2006.01)

(52) U.S. Cl.
CPC ............ *G06F 3/1243* (2013.01); *G06F 3/1204* (2013.01); *G06F 3/1265* (2013.01); *G06F 3/1268* (2013.01); *G06F 3/1287* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 7,191,237 B2 | 3/2007 | Jodra et al. | |
| 7,644,067 B2 | 1/2010 | Yeung et al. | |
| 7,855,800 B2 | 12/2010 | Forlenza et al. | |
| 9,007,637 B2 * | 4/2015 | Kulkarni | 358/1.13 |
| 9,152,355 B2 * | 10/2015 | Cogan | G06F 3/1204 |
| 2005/0010646 A1 | 1/2005 | Shiina | |
| 2007/0052994 A1 * | 3/2007 | Gullett | G06F 3/1222 358/1.15 |
| 2007/0091329 A1 | 4/2007 | Zhang | |
| 2010/0165407 A1 | 7/2010 | Witkowski et al. | |

FOREIGN PATENT DOCUMENTS

| | | |
|---|---|---|
| EP | 1691270 | 8/2006 |
| WO | WO 2014/015249 | 1/2014 |

OTHER PUBLICATIONS

Office Action for U.S. Appl. No. 13/554,344, mailed Feb. 27, 2014, 17 pages.
Office Action for U.S. Appl. No. 13/554,344, mailed Nov. 6, 2014, 25 pages.
International Search Report and Written Opinion for International Application No. PCT/US2013/051265, mailed Oct. 21, 2013.

* cited by examiner

*Primary Examiner* — Satwant Singh
(74) *Attorney, Agent, or Firm* — Cooley LLP

(57) ABSTRACT

In some embodiments, a method which includes receiving an indication of the presence of a first message from a first client device, the first message including a first specification file and a first network address associated with a first print data file. The method includes retrieving the first print data file from the first network address. The method includes processing the first specification file and the first print data file by a raster image processor.

18 Claims, 4 Drawing Sheets

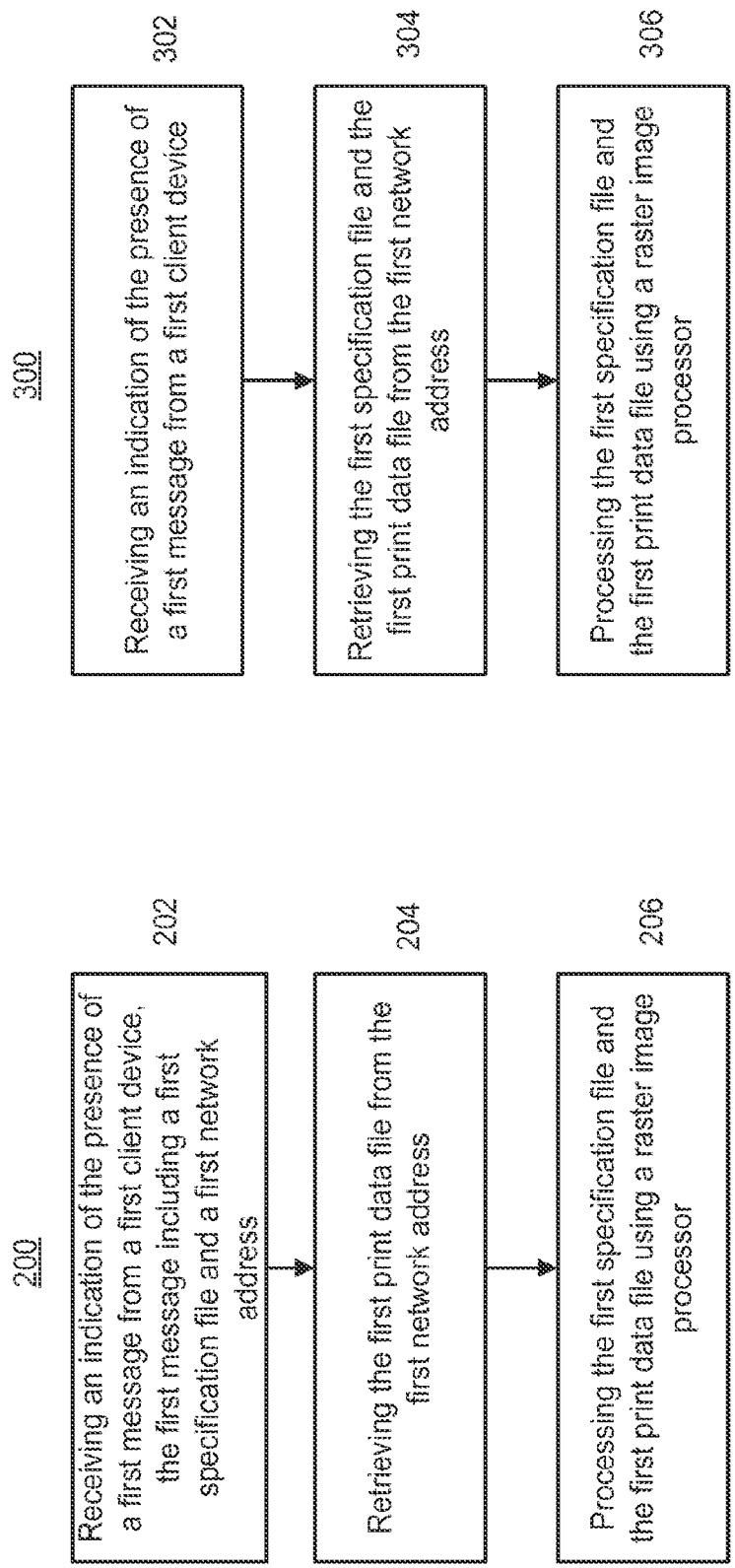

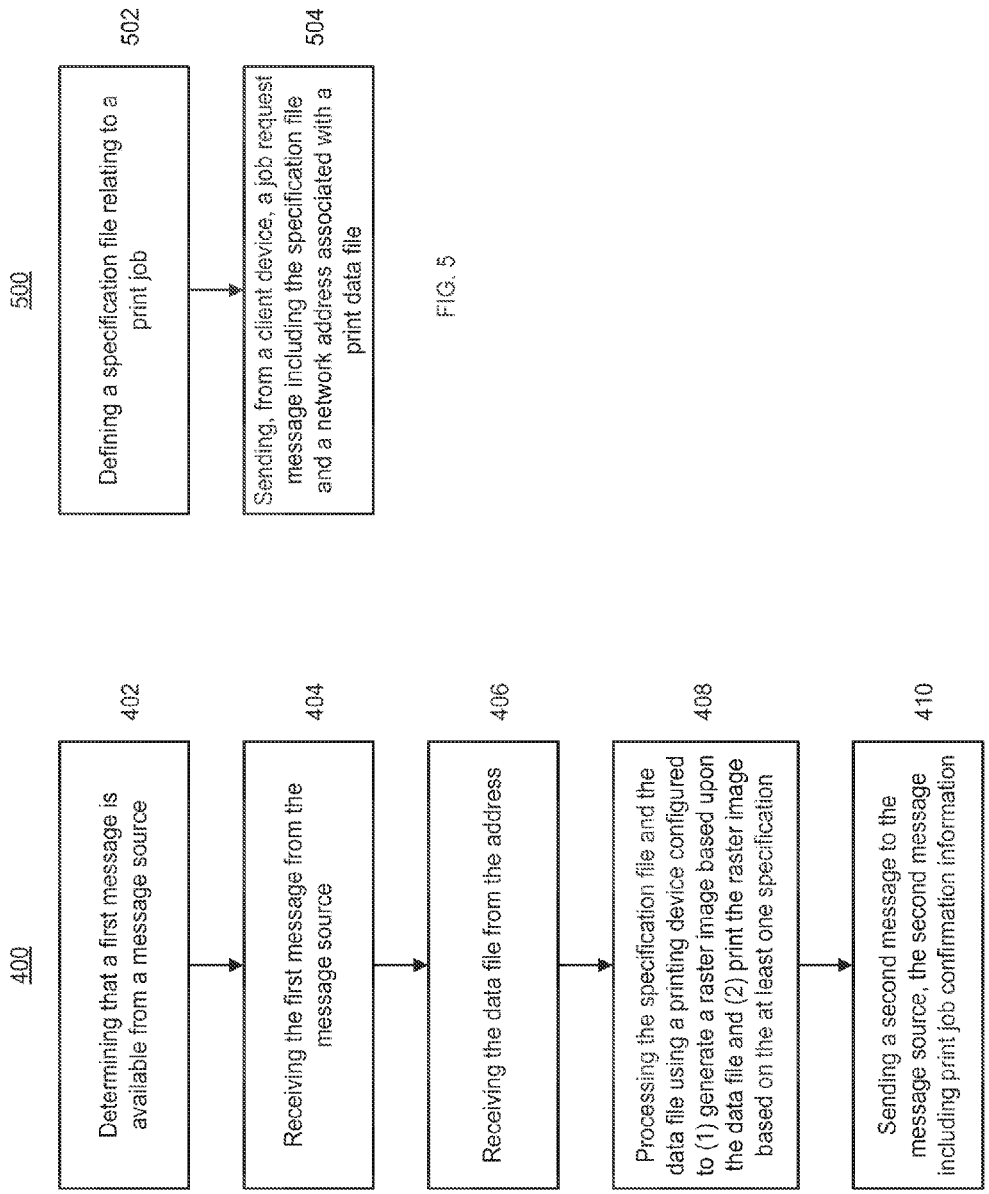

SYSTEM AND METHOD FOR PRINTABLE DOCUMENT JOB SUBMISSION

CROSS-REFERENCE TO RELATED APPLICATION

This application is a continuation of and claims priority to U.S. application Ser. No. 13/554,344, now U.S. Pat. No. 9,152,355, filed Jul. 20, 2012, entitled "SYSTEM AND METHOD FOR PRINTABLE DOCUMENT JOB SUBMISSION," which is hereby incorporated by reference in its entirety.

BACKGROUND

Some embodiments described herein relate generally to a system and method for printable document job submission.

Known systems for submission of printable document jobs exist. Such known systems can be incompatible with current network security requirements, which can result in inefficient job submission flow. By way of example, an operator of a publication device may not want to give the user of a client device direct access to the publication device. In such an example, a print job may have to be manually received and submitted to a publication server for processing.

Accordingly, a need exists for an improved system and method for printable document job submissions.

SUMMARY

In one aspect, the disclosure relates to a method which includes receiving an indication of the presence of a first message from a first client device, the first message including a first specification file and a first network address associated with a first print data file. The method includes retrieving the first print data file from the first network address. The method includes processing the first specification file and the first print data file by a raster image processor.

BRIEF DESCRIPTION OF THE DRAWINGS

FIG. 2 is a flow chart showing a method of operating a variable data printable document job submission system according to an embodiment.

FIG. 3 is a flow chart showing a method of operating a variable data printable document job submission system according to an embodiment.

FIG. 4 is a flow chart showing a method of operating a variable data printable document job submission system according to an embodiment.

FIG. 5 is a flow chart showing a method of operating a variable data printable document job submission system according to an embodiment.

DETAILED DESCRIPTION

In one aspect the disclosure relates to a method which includes receiving an indication of the presence of a first message from a first client device, the first message including a first specification file and a first network address associated with a first print data file. The method includes retrieving the first print data file from the first network address. The method includes processing the first specification file and the first print data file using a raster image processor.

In another aspect the disclosure relates to a method which includes receiving an indication of the presence of a first message from a first client device, the first message including a first network address associated with a first specification file and a first print data file. The method includes retrieving the first specification file and the first print data file front the first network address. The method includes processing the first specification file and the first print data file using a raster image processor.

In a further aspect the disclosure relates to a method which includes determining that a first message is available from a message source. The method includes receiving the first message from the message source, the first message including a specification file and an address associated with a location of a data file, the specification file including at least one specification. The method includes receiving the data file from the address. The method includes processing the specification file and the data file using a printing device configured to (1) generate a raster image based upon the data file and (2) print the raster image based on the at least one specification. The method includes sending a second message to the message source, the second message including print job confirmation information.

In a further aspect the disclosure relates to a method which includes defining a specification file relating to a print job. The method includes sending, from a client device, a job request message including the specification file and a network address associated with a print data file.

In a further aspect the disclosure relates to a method which includes defining a specification file relating to a print job. The method includes sending, from a client device, a job request message including a first network address associated with the specification file and a second network address associated with a print data file.

As used in this specification, the singular forms "a," "an" and "the" include plural referents unless the context clearly dictates otherwise. Thus, for example, the term "a message source" is intended to mean a single message source or a combination of message sources.

Figure 1:
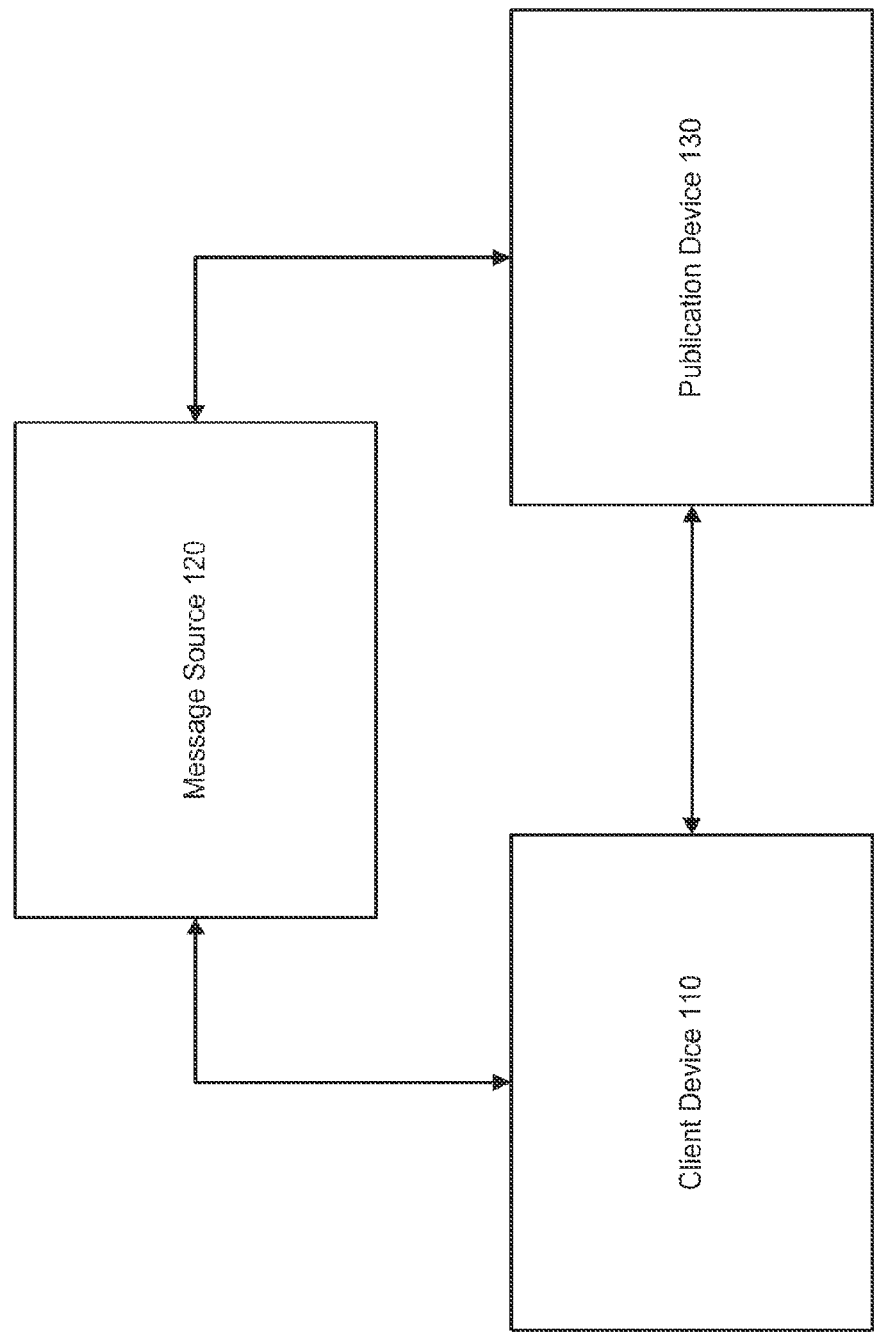
FIG. 1 is a block diagram of a variable data printable document job submission system according to an embodiment.

As is discussed below, a variable data printable document job submission system can be used to submit a printable document from a client device to a publication device such that the publication device can format, process, and/or print the printable document. FIG. 1 depicts a block diagram of a variable data printable document job submission system ("system") 100. System 100 includes a client device 110, a message source 120 and a publication device 130. Client device 110 is configured to be operatively coupled to message source 120 and publication device 130.

Client device 110 can be configured to communicate over a network, such as, for example, the internet, with publication device 130 and message source 120. Client device 110 can also be configured to facilitate interaction between a user and publication device 130 and between a user and message source 120 via the network. Specifically, client device 110 can be configured to provide a gateway for a user to define a variable data printable document print job ("print job") and send messages to, and/or receive messages from, message source 120 and/or publication device 130. In some embodiments, client device 110 can include, for example, a computer, a workstation terminal, a portable computing device, etc. Client device 110 can be configured to execute a print job process and/or program. The print job process and/or program can be a software and/or firmware program embodied in a non-transitory processor-readable medium storing code representing instructions to cause a processor to implement the program.

Client device 110 can include a variable data printable document job submission module ("job submission module") (not shown) configured to be used to define the print job. A print job can include a variable data printable document including a data file and a specification file. In some embodiments, the print job can include user information. In other embodiments, publication device 130 can receive and store the user information prior to receiving the print job. In some embodiments, the user information can be included in the specification file.

A user can operate client device 110 to select a variable data printable document template, to select graphics and fields, to input data, and to choose specifications that may not be dependent on one or more of the templates, the graphics and the fields, and/or the input data. The job submission module can be configured to process the user selected information and can define the data file and the specification file. The job submission module can package, compress, and/or secure the data file and the specification file. The data file can be, for example, a portable document format (PDF) file and can include, for example, the document template with selected fields, graphics and input data. In other embodiments, the data file can be PPML, VDX, PDF/VF, postscript, AFP, VPS, HAT, VIPP, or other type of print data file used in the commercial print industry, e.g. data files used by the RIP.

The specification file can be, for example, a job definition format (EDF) file and can include, for example, one or more specifications. A specification can include a folding instruction(s), binding instruction(s), a cutter instruction, a paper weight, a paper color, a paper size, etc. In some embodiments, a specification can be a combination of other specifications, for example, a first paper size for a first range of pages, a second paper size for a second range of pages. In some embodiments, a specification can be a logical function and/or a derivative function of data in the data file and or based on user information. By way of example, a template in a data file can include an option to select a gender (such as with a radio button), a specification can include a provision that for a range where "male" is selected, if any, to print on blue paper, and for a range where "female" is selected, if any, to print on pink paper. Said another way, the document is printed on blue paper because a user selected "boy" and may not be printed on blue paper because a user specifically selected blue paper. In some embodiments, a paper color may be selected by the user. By way of another example, a template can include an option to print on "standard" or "local" paper. In such an example, for a range of addressees, if any, located in a geographical area that uses "A4" size paper, a specification can include a provision to print that range on "A4" paper, and for a range of addressees, if any, located in a geographical area that uses "8.5×11" size paper, a specification can include a provision to print that range on "8.5×11" paper.

Client device 110 can be configured to send and/or receives messages to and/or from message source 120 and/or publication device 130. A message can include, for example, an electronic mail (e.g., a MIME format message), a job messaging format (IMF) message, or another message format. The message can transmit (1) a request to complete a variable data printable document job submission (print or job request), (2) at least a portion of the print job, (3) an instruction to monitor a location, (4) a request for an authentication token, (5) a request for a secure data exchange, (6) a request for a print job request status, and/or (6) a print job request status. In some embodiments, a request, instruction, and/or status can include, for example, a JDF command line configured to be extracted by publication device 130.

Message source 120 can be configured to communicate over a network, such as, for example, the internet, with publication device 130 and client device 110 and can facilitate interaction between a user and publication device 130. Specifically, message source 120 can provide a repository for a user to store print jobs defined at client device 110, and can send messages to and/or receive messages from client device 110 and/or publication device 130. In some embodiments, message source 120 can include, for example, an electronic storage device and/or location. Message source 120 executes a print job process and/or program. The print job process and/or program can be a software and/or firmware program embodied in a non-transitory processor-readable medium storing code representing instructions to cause a processor to implement the program.

System 100 can include a storage location (not shown), for example, a file transfer protocol folder (FTP), a hot folder, a entail folder and/or inbox, a web form, and/or a hypertext transfer protocol folder (HTTP). The storage location can be associated with a network address that can be used by client device 110 to send messages to and/or receive message from the storage location, and/or can be used by publication device 130 to send messages to and/or receive message from the storage location. In some embodiments system 100 can include more than one storage location each associated with a network address. By way of example, system 100 can be configured to store a data file in a first storage location associated with a first network address and can be configured to store a specification file in a second storage location associated with a second address.

Publication device 130 can be a device configured to receive, format, and/or finish a print job. Publication device 130 can be separated from message source 120 and/or client device 110 by a firewall and/or other network security that may prevent a user of client device 110 from directly submit a print job to publication device 130 for processing. Said another way, client device 110 may be prevented from operating publication device 130 as if it were a "local" printer, for example, as if it were commercial print equipment coupled to a secure network. Publication device 130 can include a publication server (not shown), a raster image processor (not shown), a printer module (not shown), and one or more finisher modules (not shown). In some embodiments, the publication device 130 can receive and/or format the print job via the publication server. Publication device 130 can receive the print job and can store the print job in a local storage (not shown). During a publication process, the raster image processor, printer module, and the one or more finisher modules can access the local storage. During a publication process, the print job can advance from the raster image processor, to the printer module, and to the one or more finisher modules. As the print job advances through publication device 130, the raster image processor, printer module, and one or more finisher modules can access the local storage to retrieve a specification associated with that processor or module. By way of example, a print job can advance from the printer module to a finisher module, and the finisher module can access the local storage to retrieve a finisher specification associate with that finisher module. In some embodiments, one or more specifications can advance through publication device 130 along with the printable document such that when the printable document advances to the raster image processor, the printer module, and/or the one or more finisher modules, that processor or module can be configured to receive the specification from the preceding processor or module rather than access the local storage.

The publication server of publication device 130 can be configured to (1) define the storage location of message source 120, (2) define an authorization procedure for a user to access client device 110 and/or message source 120, (3) authorize the user, (4) define an email address for a user for communication between client device 110 and message source 120 and/or publication device 130, (5) extract a command line from a message, (6) monitor the storage location of the message source and/or email address, and (7) when a new print job, data file, and/or specification file is in the storage location and/or sent to the email address, "getting," "fetching," and/or otherwise receiving the new print job, data file, and/or specification file. Publication device 130 can define a message indicating that a print job is complete and can send the message to message source 120 and/or client device 110.

While described as included in publication device 130, in some embodiments, the publication server can be separate from publication device 130 and can operate as a gateway between message source 120 and publication device 130 and/or as a gateway between client device 110 and publication device 130. In such embodiments, a single publication server can act as a gateway to more than one publication device, such as, for example, based on the characteristics of each of the one or more publication devices. Said another way, the publication server can direct a print job to a first publication device configured to apply a first specification and/or can direct the print job to a second publication device configured to apply a second specification different than the first.

The raster image processor can be configured to receive the print job, specifically the data file and the specification file, and can be configured to define a raster image based on the data file and the specification file. By way of example, the print job can include a birth announcement for a boy with a first range of addressees located in an "A4" geographic area and a second range of addressees located in an "8.5×11" geographic area. The raster image processor can define two raster images, a first raster image optimized for A4 paper and a second raster image optimized for 8.5×11 paper. The raster image processor can forward the raster image to the printer module. In some embodiments, the raster image processor can forward the raster image and the one or more specifications to the printer module. In the previous example, the raster image processor can forward the first raster image and the second raster image and can also forward a specification associated with gender and paper color to the printer module. In some embodiments, the raster image processor can be configured to receive the specification file including location information, for example an address, of the data file. In such embodiments, the raster image processor can extract the location information and retrieve the data file from a location associated with the location information. Notably, the JDF standard supports this type of embedded file locator. Note that with JDF, the initial message can point to a file location (such as a URL) hosted on the client device 110 or publication device 130. This URL can be the job (actual file to be printed and job specification file), or just the actual file to be printed.

The printer module processor can receive the raster image from the raster image processor, can access the local storage to retrieve the one or more specifications, and can print the raster image based on the one or more specifications. In the previous example, the printer module can access a specification associated with paper size and a specification associated with gender and paper color, and can print a first range of documents on blue A4 paper and can print a second range of documents on blue 8.5×11 paper. The printer module can be configured to forward the printed document to the one or more finisher modules. In some embodiments, the printer module can forward the printed document and the one or more specifications to the one or more finisher modules.

A finisher module can include, for example, a binder module configured to bind one or more printed documents and/or a folder module configured Co fold one or more printed documents. In some embodiments, publication device 130 can include a finisher module configured to apply each specification to a print job. In some embodiments, a single finisher module can apply more than one specification to a print job. Other finisher modules can include, for example, an envelope addresser module for a second printer module configured to address envelopes), an envelope "sniffer" module, a postage module, a cutter module etc.

FIG. 2 is a flow chart depicting a method 200 for submitting a variable data printable document job. Method 200 includes receiving an indication of the presence of a first message from a first client device, the first message including a first specification file and a first network address, at 202. In some embodiments, the first specification file can include a JDF file and the first message can include a email. Method 200 includes retrieving the first print data file from the first network address, at 204. In some embodiments, the first print data file can include a PDF file. Method 200 includes processing the first specification file and the first print data file by a raster image processor, at 206. In some embodiments, receiving the first message can further include monitoring a first email account associated with the first client device. In such embodiments when the first message is present in the first email account, method 200 can further include requesting the first message.

FIG. 3 is a flow chart depicting a method 300 for submitting a variable data printable document job. Method 300 includes receiving an indication of the presence of a first message from a first client device, at 302. The first message can include a first network address associated with a first specification file and a first print data file. In some embodiments, the first specification file can include a JDF file and the first message can include an email. In some embodiments, the first print data file can include a PDF file. Method 300 includes retrieving the first specification file and the first print data file from the first network address, at 304. Method 300 includes processing the first specification file and the first print data file by a raster image processor, at 306. In some embodiments method 300 can include receiving an indication of an authorization of the first client device. In such embodiments, method 300 can include sending an email address to the first client device in response to the indication of authorization. In such embodiments, the indication of authorization can include, for example, and authorization token and/or a username and password pair.

FIG. 4 is a flow chart depicting a method 400 for submitting a variable data printable document job. Method 400 includes determining that a first message is available from a message source, at 402. In some embodiments, the message source can include one of a web form, a file transfer protocol folder, a hot folder, and/or a hypertext transfer protocol folder. Method 400 includes receiving the first message from the message source, at 404. The first message includes a specification file and an address associated with a location of a data file, and the specification file includes at least one specification. In some embodiments, the specification file can include a JDF file and the specification can includes a folding instruction. Method 400 includes receiving the data file from the address, at 406.

Method 4000 includes processing the specification file and the data file by a publication device configured to (1) generate a raster image based upon the data file and (2) print the raster image based on the at least one specification to a printer, at 408. In some embodiments, providing the specification file and the data file includes defining a printable document file and providing the printable document file to the raster image processor. Method 400 includes sending a second message to the message source, the second message including print job confirmation information, at 410.

FIG. 5 is a flow chart depicting a method 500 for submitting a variable data printable document job. Method 500 includes defining a specification file relating to a print job, at 502. In some embodiments, the specification file can include a JDF file. Method 500 includes sending, from a client device, a job request message including the specification file and a network address associated with a print data file, at 504. In some embodiments, the network address corresponds to a network location of one of a file transfer protocol folder, a hot folder, or a hypertext transfer protocol folder. In some embodiments, the data file includes a PDF file. In some embodiments, the job request message comprises an email message. In some embodiments, the job request message includes an instruction to monitor a message source. In such embodiments, when a specification file is present at the message source, the method can further include retrieving the specification file from the first network address. In some embodiments, method 500 can include sending, from a client device, a job request message including a first network address associated with the specification file and a second network address associated with a print data file. In such embodiments, the second network address can be the same as the first network address.

Figure 6:
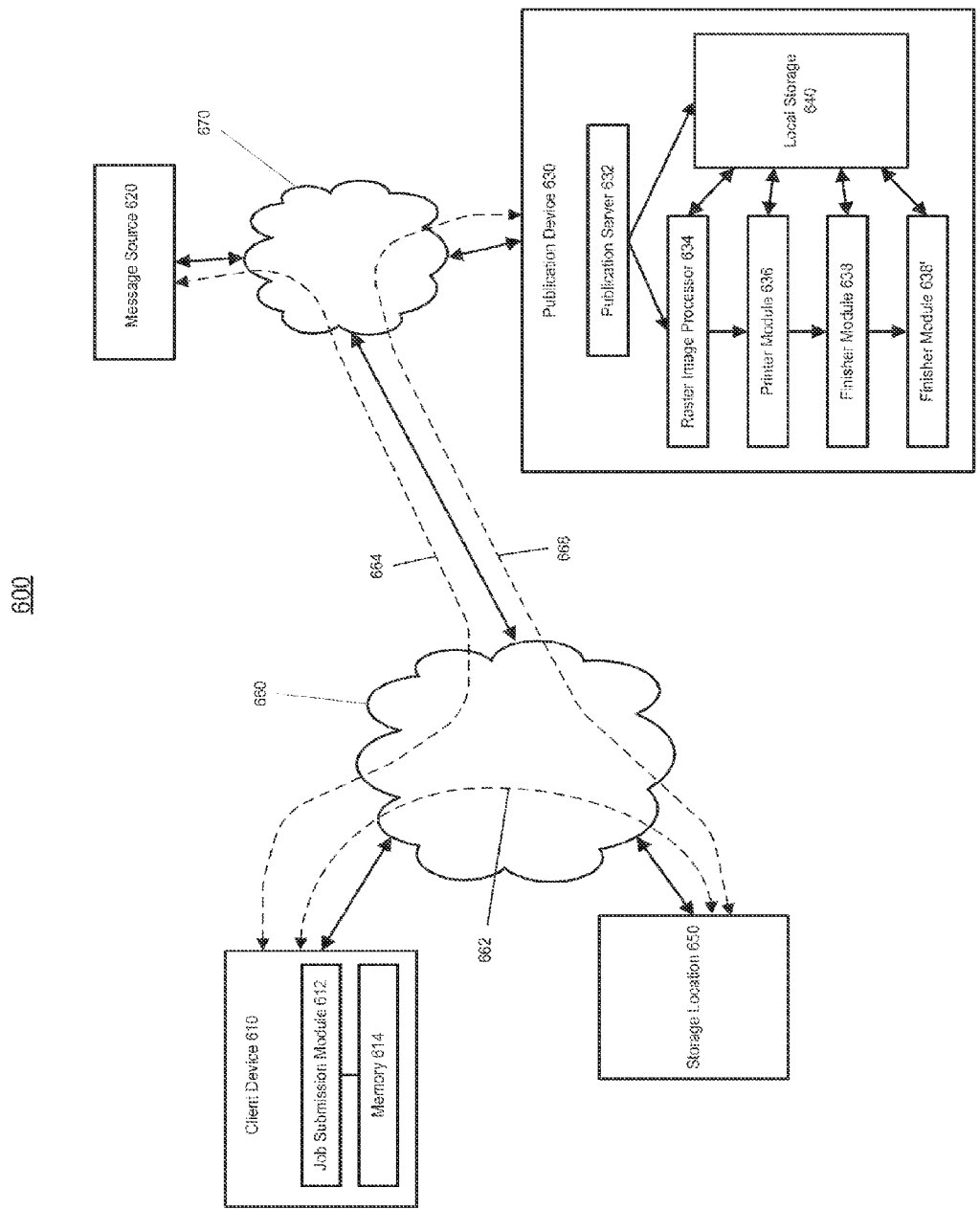
FIG. 6 is a schematic diagram of a variable data printable document job submission system according to an embodiment.

FIG. 6 depicts schematic view of a variable data printable document job submission system ("system") 600 according to an embodiment. System 600 can be similar to, and include similar elements to, system 100 described above. By way of example, system 600 can include a publication device 630 which can be similar to publication device 130. System 600 can be used to submit a variable data printable document from a client device to a publication device such that the publication device can format, process, and/or print the variable data printable document.

System 600 includes a client device 610, a message source 620, a storage device 650, and a publication device 630. As shown in FIG. 6, message source 620 can be operatively coupled to publication device 630 a first network 670. First network 670 is configured to be operatively coupled to client device 610 and storage location 650 via a second network 660. Said another way, message source 620 and/or publication device 630 can be configured to be operatively coupled to client device 610 and/or storage location 650 via first network 670 and/or second network 660. In such embodiments, first network 670 can include, for example a local area network and second network 660 can include a wide are network, the internet, etc. In such embodiments first network 670 can be a secured network, for example, isolated from a connected unsecured network, for example, second network 660, via a gateway device (not shown) or other device to prevent unauthorized access and/or communication. While FIG. 6 depicts client device 610 operatively coupled to storage location 650 via second network 660, in some embodiments, client device 610 and storage location 650 can be included on a third network (not shown), and can be operatively coupled to first network 670 via the third network and second network 660. Client device 610 includes a job submission module 612 and a memory 614. Publication device 630 includes publication server 632, raster image processor 636, printer module 636, a first finisher module 638, a second finisher module 638', and a local storage 640.

An exemplary printable document job submission process is described herein with reference to FIG. 6. A user may operate system 600 to produce a double sided "legal." size laminated food menu. The user can operate client device 610 to request access to publication device 630. Publication server 632 can receive the request and can define a response to client device 610 to include an address. In some embodiments, the address can be associated with storage location 650. In some embodiments, the address can be associated with an email account monitored by publication server 632. The user can operate client device 610 to define a print job. In some embodiments, defining a print job can include accessing templates, graphics, and/or other data stored in memory 614. In other embodiments, defining a print job can include accessing templates, graphics and/or other data stored outside of client device 610. Job submission module 612 can process the selected templates, graphics, and data, as well as user input data to define the printable document file, including a print data file and a specification file. Client device 610 can transmit the printable document file to storage location 650, for example, via path 662. In some embodiments, the print data file can be stored in a first storage location 650 and the specification file can be stored in a second storage location 650. In this example, storage location 650 can include an HTTP folder.

Client device 610 can generate and transmit a message to message source 620, for example via path 664, indicating that a new print job is stored in storage location 650 and can provide an address associated with storage location 650. Publication device 630 can monitor message source 620, and in response to message source 620 receiving the message, publication server 632 can fetch the print job from the storage location 650, using, for example, a "web http: fetch" operation via path 668. In some embodiments, the "http: fetch" command can be initiated based on a extracted MI: command file in the message. The operation used by publication server 632 to retrieve the print job can be based on the characteristics of the storage location 650. Publication server 632 can receive the print job and can retrieve data to be included in the printable document not currently included in the print job. By way of example, the print job may include a picture stored in local storage 640, or located at a network address, such as an internet address, in such an embodiment, publication server 632 can retrieve that picture for inclusion in the printable document. By way of example, a document template may offer a user a choice between 3 images, each of which is imbedded as low resolution images in the template. Other examples of retrievable data include lists of addressees. The publication server 632 can store any portion of the print job on the local storage 640 for access by any element of the publication device 630 during the publication process.

Publication server 632 can send the print job, including the data file, the specification file, and any retrieved data to raster image processor 634. In some embodiments, publication server 632 can send an indication to raster image processor 634 that a new print job is available in storage location 650. In such embodiments, in response to the indication, raster image processor 634 can retrieve the print job, including the data file, the specification file, and any retrieved data. Raster image processor 634 can define a raster image based on the data file, the specification file, and the retrieved data. In this example, the raster image processor 634 can layout the image to fit a legal size paper, can prepare a first raster image for the first side of the menu, and a second raster image for the second side of the menu. Raster image processor 634 can transmit the first raster image and the second raster image to printer module 636, Printer module 636 can access local storage 640 to retrieve any associated specification from the specification file. In this example, printer module 636 can retrieve a specification indicating that printable document is double sided and should be printed on legal paper. In other embodiments, the specification file and/or individual specifications can be transmitted to printer module 636. Printer module 636 can print the first raster image on a first side of a legal page and can print the second raster image on a second side of the legal page, and can move the printed document to first finisher module 638. In some embodiments, printer module 636 can print a plurality of printed documents prior to forwarding the printed documents to first finisher module 638. Whether the printer module 636 forwards printed documents individually or in groups to first finisher module 63$ can be based on the capabilities of the printer module 636, second finisher module 638 and/or a specification. In some embodiments, the raster image processor 634 can receive a message which indicates how to fetch the details of the job and also how to fetch the actual file to be printed, in two separate steps. Notably, this is the case with print tasks defined with the JDF standard, where JMF is a communications protocol for use with JDF, and a JMF message is sent to the RIP containing file locations or other instructions on how to fetch specified print job and print file information.

First finisher module 638 can be, for example, a laminator module. In this example, first finisher module 638 can receive the printed document, can access a specification from local storage and/or receive a specification from printer module 636, and can laminate the printed documents in accordance with the specification. Finisher module 638 can send the laminated printed documents to second finisher module 638' for packaging and or can send the laminated printed documents to a waiting area for later distribution and or packaging.

After the print job is complete, publication server 632 can define a message indicating that the print job is complete, and can send the message to client device 610, to message source 620, and/or to an alternative location designated by the user during the job submission process.

While the exemplary printable document job submission process above describes client device 610 sending the print data file and the specification file to message source 620, and sending a subsequent message to the publication server 632 indicating the new print job, other embodiments are possible. For example, client device 610 can send a message including the print data file and the specification file to an email account monitored by publication server 632, and the publication server 632 can extract the print job from the email and process it as described above. In some embodiments, client device 610 may not send the subsequent notification message to publication server 632, and instead, publication server 632 can monitor message source 620 independently from client device 610. In some embodiments, client device 610 can send a message including one of the print data file and the specification file and an address associated with a location of the other of the print data file and the specification file. In some embodiments, client device 610 can send a message to the publication server indicating an address associated with a location of one of the print data file and the specification file, the publication server 632 can retrieve that file from the location along with a second address associated with a second location of the other of the print data file and the specification file.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, while FIG. 6 depicts a local storage 640 and publication server 632 as being included in publication device 630, in some embodiments, one or both of local storage 640 and/or publication server 632 can be separate, physically and/or logically from publication device 630. In this manner, local storage 640 and/or publication server 632 can serve more than one publication device 630.

Where methods described above indicate certain events occurring in certain order, the ordering of certain events can be modified. Additionally, certain of the events can be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A method, comprising:
   receiving, at a publication server from a first message source, an indication of a presence of a first message from a first client device different from the first message source, the first message including a first specification file and a first network address associated with a first print data file;
   retrieving, by the publication server, the first print data file from a storage location separate from the publication server and associated with the first network address; and
   processing the first specification file and the first print data file by a printing device configured to (1) generate a first raster image based upon the first print data file and (2) print the first raster image based on the first specification file.

2. The method of claim 1, wherein the first specification file comprises a first Job Definition Format (JDF) file.

3. The method of claim 1, further including:
monitoring the first message source associated with the first client device; and
when the first message is present in the first message source, requesting the first message.

4. The method of claim 1, further including:
receiving, at a publication server from a first message source, an indication of a presence of a second message from a second client device, the second message including a second specification file and a second network address associated with a second print data file;
retrieving, by the publication server, the second print data file associated with the second network address; and
processing the second specification file and the second print data file using the raster image processor to (1) generate a second raster image based upon the second print data file and (2) print the second raster image based on the second specification file.

5. The method of claim 4, further including
monitoring a second message source associated with the second client device; and
when the second message is present in the second message source, requesting the second message.

6. The method of claim 1, wherein the first specification file includes a binding instruction.

7. The method of claim 1, wherein receiving the indication of the presence of the first message includes receiving the indication of the first message via a firewall between the publication server and the first client device, the firewall configured to prevent receipt of messages from the first client device.

8. A method, comprising:
monitoring a first message source associated with a first client device;
receiving an indication of a presence of the first message from the first client device, the first message including a first network address associated with a first specification file and a first print data file;
retrieving, at the publication server from a storage location separate from the publication server, the first specification file and the first print data file associated with the first network address; and
processing the first specification file and the first print data file by a printing device configured to (1) generate a raster image based upon the first print data file and (2) print the raster image based on the first specification file.

9. The method of claim 8, wherein the first message comprises a first email message and the first specification file comprises a first Job Definition Format (JDF) file.

10. The method of claim 8, further including:
receiving, at a publication server from a first message source, an indication of a presence of a second message from a second client device, the second message including a second network address associated with a second specification file and a second print data file;
retrieving, by the publication server, the second specification file and the second print data file associated with the second network address; and
processing the second specification file and the second print data file by the raster image processor to (1) generate a second raster image based upon the second print data file and (2) print the second raster image based on the second specification file.

11. The method of claim 8, further including:
receiving an indication of an authentication of the first client device; and
sending, in response to the receiving, an email address to the first client device, the email address configured to receive the first message.

12. The method of claim 11, wherein the indication of the authentication is of an authentication token or an authorized username and password pair.

13. A method, comprising:
defining a specification file relating to a print job;
sending, from a client device, a job request message including a first network address associated with the specification file and a second network address associated with a print data file, the job request message including an instruction (1) to monitor a message source and (2) to retrieve the specification file from the first network address; and
processing the specification file and the print data file by a printing device configured to (1) generate a raster image based upon the first print data file and (2) print the raster image based on the first specification file.

14. The method of claim 13, wherein the first network address corresponds to a network location of at least one of a file transfer protocol folder, a hot folder, or a hypertext transfer protocol folder.

15. The method of claim 13, wherein the second network address is the same as the first network address.

16. The method of claim 13, wherein the specification file is a Job Definition Format (JDF) file.

17. The method of claim 13, wherein the data file is a portable document format (PDF) file.

18. The method of claim 13, wherein the job request message comprises an email message.

* * * * *